US005484734A

United States Patent [19]

Kimura

[11] Patent Number: 5,484,734

[45] Date of Patent: Jan. 16, 1996

[54] REACTION VESSEL FOR PREVENTING EVAPORATION AND A METHOD THEREOF

[75] Inventor: Shiro Kimura, 7-15, 1-Chome, Sakuramachi, Koganei-shi, Tokyo, Japan

[73] Assignees: Torc Seimitsu Industries, Ltd., Hokkaido; Shiro Kimura; Hideki Munekuni, both of Tokyo, all of Japan

[21] Appl. No.: 284,802

[22] Filed: Aug. 2, 1994

Related U.S. Application Data

[63] Continuation-in-part of Ser. No. 90,657, Jul. 13, 1993, abandoned.

[30] Foreign Application Priority Data

Mar. 9, 1993 [JP] Japan .................................... 5-47804

[51] Int. Cl.[6] ................................ G01N 1/00; B01L 3/00

[52] U.S. Cl. ........................... 436/176; 436/174; 422/99; 422/102

[58] Field of Search ..................... 422/99, 102; 436/174, 436/176, 810

[56] References Cited

U.S. PATENT DOCUMENTS

| | | | |
|---|---|---|---|
| 3,464,798 | 9/1969 | Kilthau | 422/102 |
| 3,481,477 | 12/1969 | Farr | 210/359 |
| 3,590,889 | 7/1971 | Vannus | 422/100 X |
| 3,802,843 | 4/1974 | Kim | 422/71 |
| 3,819,045 | 6/1974 | Greenwald | 422/99 X |
| 3,865,551 | 2/1975 | Saiki et al. | 422/99 |
| 3,865,552 | 2/1975 | Marston | 422/102 |
| 4,037,464 | 7/1977 | Wenander | 422/100 X |
| 4,308,232 | 12/1981 | Crouther et al. | 422/102 |
| 4,336,880 | 6/1982 | Mehl | 422/102 X |
| 4,644,807 | 2/1987 | Mar | 422/100 X |
| 4,675,159 | 6/1987 | Al-Sioufi | 422/102 X |
| 4,755,356 | 7/1988 | Robbins et al. | 422/102 |
| 4,956,298 | 9/1990 | Diekmann | 422/102 X |

*Primary Examiner*—James C. Housel
*Assistant Examiner*—Maureen M. Wallenhorst
*Attorney, Agent, or Firm*—Darby & Darby

[57] ABSTRACT

A reaction vessel and method of preventing evaporation employing a vessel body, a cap closing an open end of the vessel body and a piston head movable within the volume defined by the vessel body. A fluid to be reacted is introduced into the vessel body. An inner passage gradually converges toward the closed end from the open end so that the piston head, which is compressible, increasingly deforms under compression as it displaces further away from the open end. The piston head is moved tip a relative position relative to the closed end so that it sealingly engages the wall of the vessel and is positioned adjacent the upper surface of the fluid. In this position, the fluid may be heated to promote the reaction and evaporation is prevented by the piston head being adjacent the upper surface of the fluid and sealingly engaging the vessel wall.

14 Claims, 2 Drawing Sheets

REACTION VESSEL FOR PREVENTING EVAPORATION AND A METHOD THEREOF

CROSS-REFERENCE TO COPENDING APPLICATIONS

This is a continuation-in-part of Ser. No. 08/090,657, filed Jul. 13, 1993, now abandoned.

BACKGROUND OF THE INVENTION

The present invention relates to a reaction vessel which receives a solution. Heat is applied to the vessel to heat the solution and thereby create a reaction. After the reaction is complete and the contents of the reaction vessel are withdrawn, the reaction vessel is disposed of as a waste product.

Certain processes require the application of heat to a solution, particularly when it is desired to cause the solution to react in a particular manner. For example, heat is applied to a solution to initiate the polymerase chain reaction (PCR) which is used to amplify DNA fragments in the biotechnology field.

Such reactions may involve different enzymes and variations in temperature as well as extended reaction times of, for example, between four and five hours. The heating may be effected by hot water, radiation heat or other heating apparatuses.

During such processes, it is undesirable to permit any evaporation of the solution from the vessel. For this reason, a non-volatile liquid, such as mineral oil with a specific gravity of a value less than that of the solution, is added to the vessel to cover the solution so as to prevent evaporation. Alternatively, it is common practice to reduce the volume of solution that evaporates by inserting an inner cover of a predetermined size in the upper cover of the reaction vessel.

However, these techniques have their own drawbacks. It is troublesome to remove the non-volatile liquid such as mineral oil from the solution after the reaction. Impurities contained in the solution may block the occurrence of the reactions. The location of the inner cover determines the volume of solution that may be accommodated. SUMMARY OF THE INVENTION The present invention is directed to a reaction vessel that prevents the evaporation of the solution or fluid undergoing the reaction. The reaction vessel defines an inner passage that gradually converges from an open end to a closed end. The open end preferably is closed by a cap having an opening, through which extends a piston rod. A piston head is attached to the end of the piston rod and sealingly engages with the vessel body wall in an airtight manner as it is pushed further into the inner passage. If desired, the rod and opening may be configured to frictionally engage each other to help retain a piston head at a desired relative location within the inner passage.

The bottom of the inner passage has a diameter that is smaller than the uncompressed diameter of the piston head and the top of the inner passage has a diameter that is larger than the uncompressed diameter of the piston head. As a result, the piston head, which is preferably elastic, deforms under compressive forces as it is pushed from the top toward the bottom of the inner passage and sealingly engages with the vessel body wall. By positioning the piston head adjacent to an upper surface of the fluid, evaporation of the fluid is prevented during subsequent heating and reaction of the fluid.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
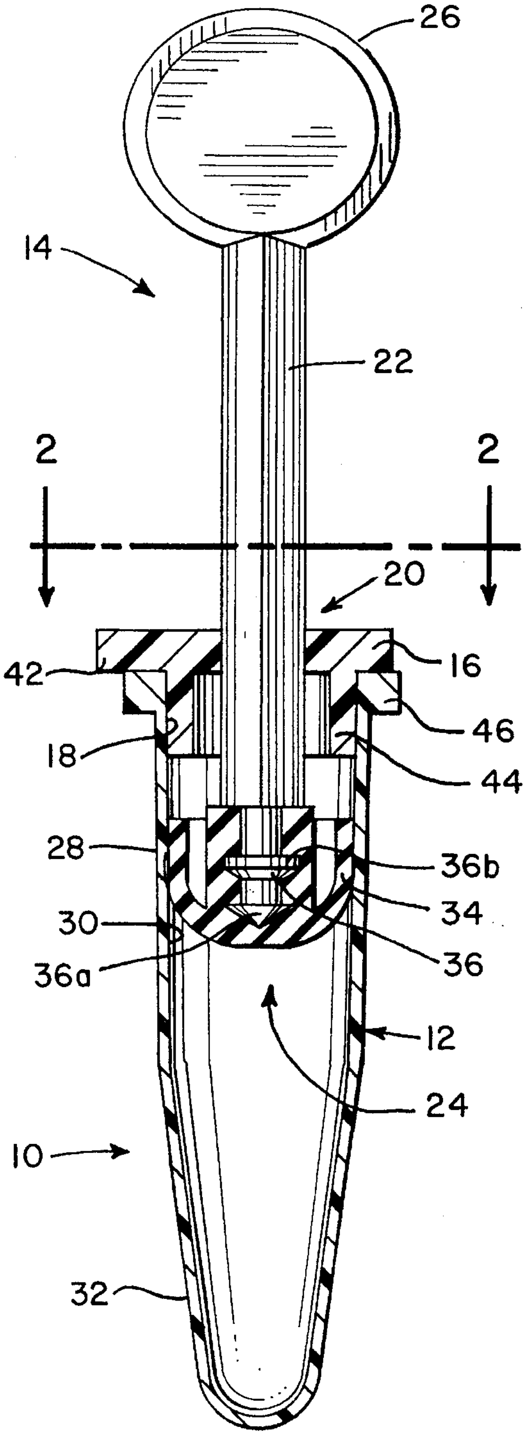
FIG. 1 is an elevational view in partial cross-section of the reaction vessel with a piston head in a raised position in accordance with the invention.

The reaction vessel 10 includes a vessel body 12, a piston 14 movable within the vessel body 12, and a cap 16 fitted into an open upper end 18 of the vessel body 12 and having an opening 20 for guiding the displacement of the rod 22 of the piston 14. At an end of the rod 22 within the confines of the vessel body 12 is a piston head 24 and at the opposite end of the rod 22 outside the vessel body 10 is a plate-like element 26, which is to be grasped with fingers and pushed or pulled to further insert or withdraw the piston 14.

The vessel body 10 has an upper portion 28 whose inner surface 30 is circular in configuration in a direction transverse to its direction of elongation. Lengthwise, the inner surface 30 gradually converges from the open upper end 18 to the bottom portion 32 and thereafter more steeply converges to the closed end of the bottom portion 32 in a generally conical manner.

The piston head 24 includes a stopper 34 and projections 36 for securing the stopper 34 to the end of the piston rod 22. The projections 36 may include two beveled extensions *36a*, *36b*, around whose contour is formed the stopper 34 in a conventional manner for retaining the stopper to the rod 22.

The diameter of the stopper 34 in its uncompressed condition is slightly smaller than the internal diameter of the upper open end 18 of the upper portion 28. The inner passage of the vessel body gradually converges away from the upper open end 18 to the bottom portion 32. The stopper 34 deforms as it is pushed further into the converging inner passage due to its engagement with the vessel wall. The stopper, being made preferably of an elastic and plasticized synthetic material such as rubber, undergoes compression during its deformation so as to form a seal with the vessel wall at the engagement.

Figure 4:
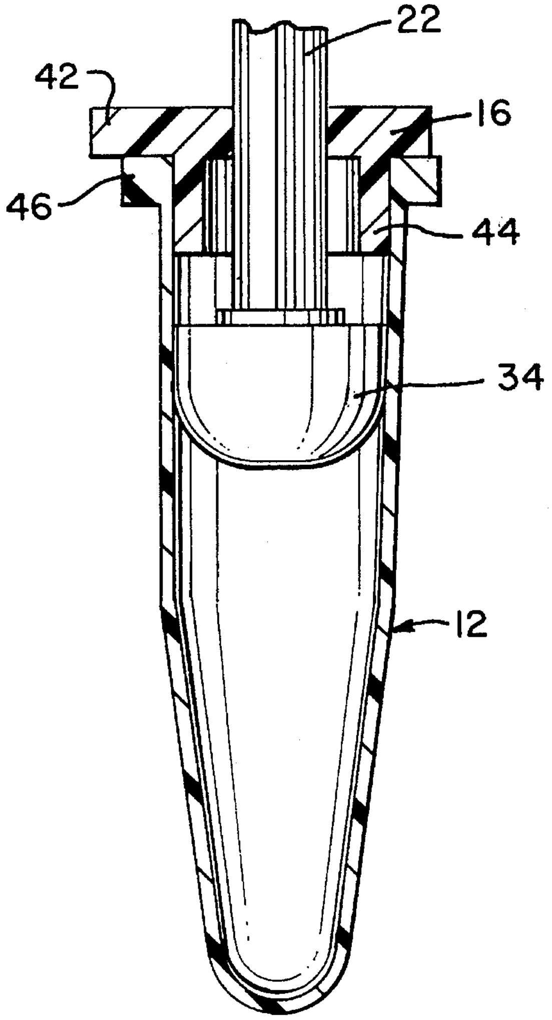
FIGS. 4 and 5 are detailed vertical sectional views of the reaction vessel respectively showing the piston in different positions.
Figure 5:
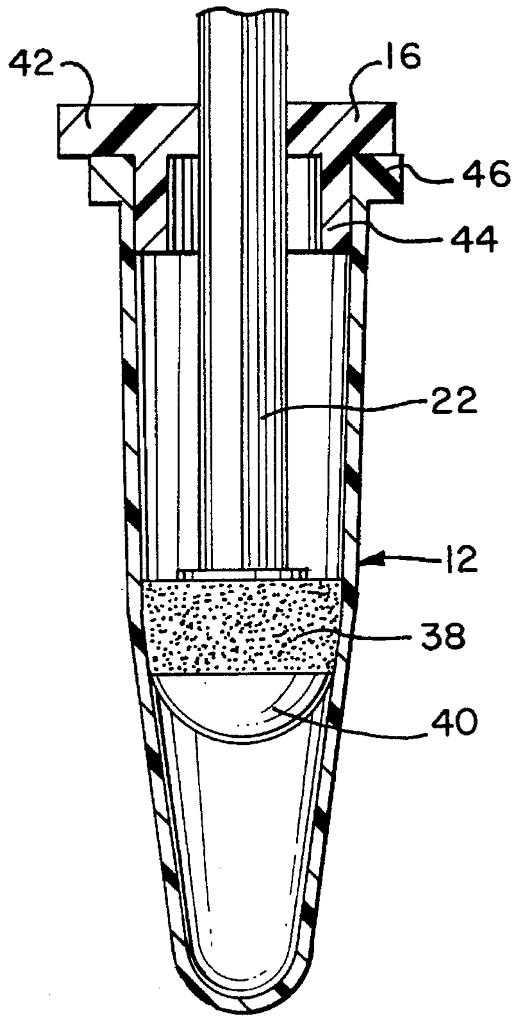

Turning to FIGS. 4 and 5, the stopper 34 is shown deforming as it moves further into the vessel body 12. Referring to FIG. 5, the outer portion 38 of the stopper 34 that engages this inner surface 30 is under compression and even the remaining portion 40 of the stopper deforms in response to compressive forces imposed on the stopper. In effect, the stopper 34 is being squeezed into a smaller space within the vessel body as it is pushed in further from the open upper end 18.

Figure 2:
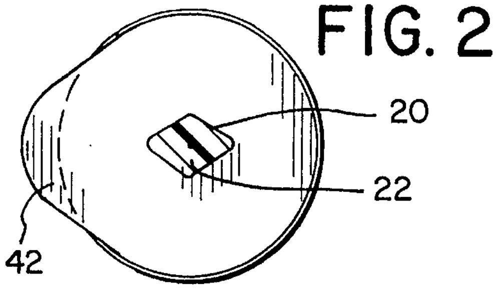
FIG. 2 is top view in partial cross section taken along section lines 2—2 of FIG 1.
Figure 3:
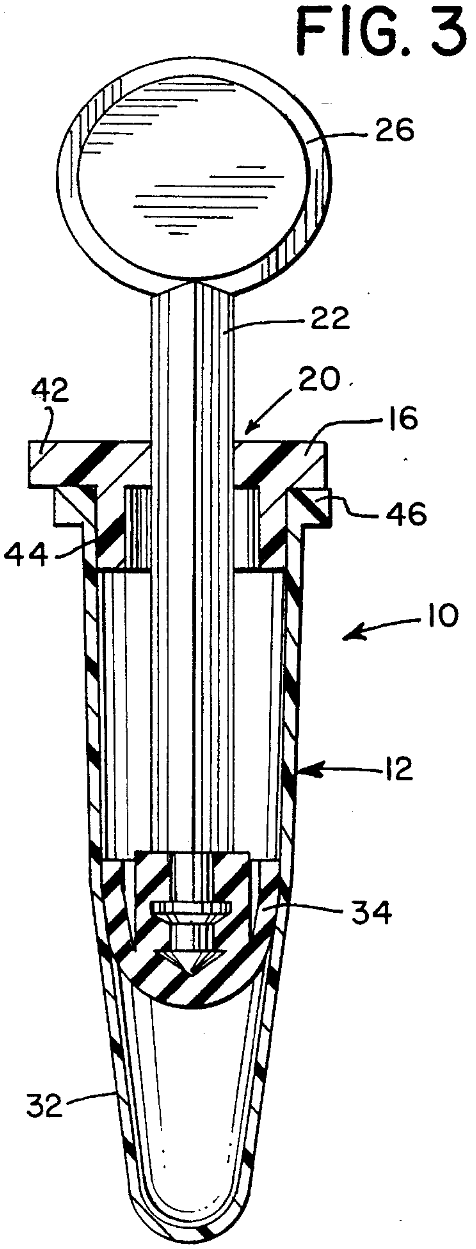
FIG. 3 is a vertical sectional view of the reaction vessel and the piston in raised position.

Turning to FIG. 2, the piston rod 22 is shown having a diamond-shaped cross-section fitted within an opening 20 in the cap 16 that conforms in shape to the diamond-shape cross-section of the rod 22. Such a diamond-shape is intended to facilitate smooth movement of the piston head within the vessel body as the piston moves up and down. In addition, the diamond shape aids in fixing the piston head in position by frictionally engaging the piston rod 22. The shape may be that of any polygon, which has corners that prevent relative rotation of the piston rod 22 within the opening 20.

The plate-like element 26 is grasped to push in or pull out the piston head from the inner passage of the vessel body or to move the entire assemblage of the reaction vessel 10 as a unit, i.e., the piston 14, cap 16 and vessel body 12. Further, the plate-like element 26 prevents the piston rod 22 from passing through the opening 20 in the cap 16 and thereby ensures engagement between the piston rod 22 and the cap 16. In addition, the cap 16 has a tab extension 42 to facilitate manual removal of the cap 16 from the vessel body 12.

The reaction vessel 10 itself may be held in position by a holding tray (not shown) during the heating to effect the reaction within the reaction vessel, but fluid filling and piston rod withdrawal are done preferably by manual manipulation. Indeed, where the heating is effected at relatively low temperatures such as 35° C. to 94° C., the heating does not affect the integrity of the seal formed by the piston head with the inclined inner surface 30 of the vessel body 12.

With the vessel body 12 in an upright and open condition (i.e., the open end 18 is not capped), a solution or fluid to be reacted may be introduced into the inner passage through the open end to fill the vessel body 12 to essentially any desired level. The fluid level preferably is substantially higher than one-third the height of the bottom portion 32 to allow the piston head 24 to be properly positioned. If the fluid level is lower than the one-third of the height of the bottom portion 32, it becomes difficult to move the piston head to a position adjacent the fluid level. This difficulty arises because of increasing resistance against further squeezing of the stopper into such a smaller volume.

The cap 16 is then positioned to frictionally engage with and close the open end. Simultaneously, the piston head 24 is inserted into the inner passage of the vessel body since the piston rod extends through the opening in the cap. The cap 16 has a depending member 44 that frictionally engages with the inner facing surface 30 of the vessel body 12 at the open upper end 18 to retain the cap in place. Also, the cap 16 rests on a flange 46, which extends outwardly from the open end 18.

After the plate-like element 26 is grasped and moved to push the piston head 24 further into the inner passage, the piston head may reach a position immediately adjacent the upper surface of the fluid. Such movement causes the stopper 34 of the piston head 24 to deform due to its engagement with the converging inner surface of the wall of the vessel body. The piston head 24 is retained in position adjacent to the top surface of the fluid because of the stopper's engagement with the wall. As a consequence, the volume of the fluid corresponds to that defined between the stopper and the closed end of the vessel body. Such engagement between the stopper 34 and the wall creates a seal, which prevents evaporation of the fluid when heated while the piston head is retained in position.

The steps for taking apart the reaction vessel are in reverse order. First, the cap 16 is separated from the reaction vessel (e.g., by manual manipulation of the tab 42). Next, the piston head 24 is pulled out of the reaction vessel together with the cap 16. Finally, the fluid is withdrawn, such as with a syringe (not shown).

For the sole purpose of exemplifying suitable dimensions for the preferred embodiment, the reaction vessel preferably has a capacity of about 0.5 ml to 10.0 ml and a diameter of about 6 to 8 mm and a height of about 30 mm. The fluid volume within the reaction vessel preferably is within the range of 10 μl to 200 μl. However, these dimensions are for illustrative purposes only and it is understood that the present invention is not limited to these dimensions.

The vessel body may have a different configuration from that depicted in the preferred embodiment provided the piston head increasingly deforms as it moves further from the open end of the vessel body due to engagement with inclining surfaces that slope inwardly toward the bottom of the vessel body to sealingly engage the vessel walls. The bottom portion of the vessel body, however, need not be conical but could be other shapes so long as it is filled with the reaction fluid and thereby does not contain air pockets.

While the cap 16 is important for providing a means for guiding reciprocal movement of the rod, i.e., through its opening 20, and to help retain the rod and thereby the piston head 24 in position, it may be dispensed with. The stopper 34 may be positioned and retained to seal the defined volume beneath it to correspond to the volume displaced by the reaction fluid so that evaporation is prevented. To achieve this, the stopper 34 is non-porous and free of any through-going apertures.

While the foregoing description and drawings represent the preferred embodiments of the present invention, it will be understood that various changes and modifications may be made without departing from the spirit and scope of the present invention.

What is claimed is:

1. A reaction vessel for preventing evaporation of a fluid received therein, the reaction vessel comprising:

a vessel body having an open end and a closed end, said vessel body having a wall that defines an inner passage that converges from said open end toward said closed end so that fluid contained within said vessel body displaces a volume within said inner passage from said closed end to a height lower than that of the open end and at a position wherein said inner passage converges;

means for preventing evaporation of fluid within the vessel body, said preventing means including a displaceable piston having a rod and a deformable piston head attached to said rod, said rod being operative for moving said piston head from said open end where said piston head is in a relaxed, undeformed condition to a relative position that is at the height of the fluid within said inner passage where said piston head is in a deformed condition, said piston head being free of through-going apertures, said piston head deforming in shape as said piston head moves to the relative position because of the convergence of said inner passage and sealingly engaging with the wall at the height of the fluid.

2. The vessel of claim 1, wherein said piston head is composed of an elastic material.

3. The vessel of claim 1, further comprising a cap closing said open end and having a through-going opening, said rod extending through said opening, said opening being configured for permitting reciprocal movement of said rod.

4. The vessel of claim 3, wherein said opening in said cap conforms in shape to a transverse cross-section of said rod, said shape being a polygon.

5. The vessel of claim 4, wherein said shape resembles that of a diamond.

6. The vessel of claim 3, wherein said cap includes depending members that frictionally engage with an inner facing surface of the vessel body at said open end.

7. The vessel of claim 3, wherein said cap includes a base portion covering said open end and a tab portion extending outwardly from said base portion on an exterior side of the vessel body.

8. A method of preventing evaporation of a fluid within a reaction vessel, comprising the steps of:

introducing a fluid through an open end of a vessel body and into a volume defined by said vessel body, said vessel body having an open end, a closed end and a wall that defines an inner passage that converges from said open end towards said closed end so that fluid contained within said vessel body displaces volume within said inner passage from said closed end to a height within the vessel body that is lower than that of the open end and that is at a position wherein said inner passage converges; and preventing evaporation of fluid within the vessel body by operatively moving a piston rod to move a deformable piston head from said open end where said piston head is in a relaxed, undeformed condition to a relative position that is at the height of the fluid within said inner passage where said piston head is in a deformed condition, said piston head being free of through-going apertures, the piston head deforming in shape as said piston head moves to the relative position because of convergence of said inner passage so that said deformable piston head sealingly engages with the wall at the height of the fluid.

9. A method as in claim 8, wherein said deformable piston head is composed of an elastic material.

10. A method as in claim 8, further comprising the steps of:

closing the open end of the vessel body with a cap after the step of introducing, the fluid the cap having an opening; and thereafter guiding reciprocal movement of the rod with the opening, the rod extending through the opening.

11. A method as in claim 10, wherein the step of guiding includes the step of frictionally engaging the opening in the cap with the rod, said opening in said cap conforming in shape to a transverse cross-section of said rod, said shape being a polygon.

12. The method of claim 11, wherein said shape resembles that of a diamond.

13. The method of claim 10, wherein the step of closing said open end includes frictionally engaging an inner facing surface of the vessel body at said open end with depending members of said cap.

14. The method of claim 10, further comprising after the step of guiding, the step of removing said cap from said vessel body by pushing relative to said vessel body a tab portion that extends outwardly from a base portion of said cap on an exterior side of the vessel body.

* * * * *